United States Patent
Dufour et al.

(10) Patent No.: US 9,254,902 B2
(45) Date of Patent: Feb. 9, 2016

(54) CONTROLLING BUOYANCY OF AN UNDERWATER VEHICLE USING A DUAL-INTERNAL-RESERVOIR CONFIGURATION TO ENHANCE EFFICIENCY OF INFLATING AND DEFLATING AN EXTERNAL CHAMBER

(71) Applicant: MRV SYSTEMS, LLC, San Diego, CA (US)

(72) Inventors: James Edward Dufour, Solana Beach, CA (US); Brian Kenneth Newville, San Diego, CA (US)

(73) Assignee: MRV Systems, LLC, San Diego, CA (US)

( * ) Notice: Subject to any disclaimer, the term of this patent is extended or adjusted under 35 U.S.C. 154(b) by 0 days.

(21) Appl. No.: 14/178,243

(22) Filed: Feb. 11, 2014

(65) Prior Publication Data
US 2015/0225051 A1    Aug. 13, 2015

(51) Int. Cl.
*B63G 8/22*    (2006.01)
(52) U.S. Cl.
CPC ........................................ *B63G 8/22* (2013.01)
(58) Field of Classification Search
CPC .... G05D 1/0206; B63H 21/213; B63H 21/22; B63H 25/42; B63B 49/00; B63G 8/22
USPC ..................... 701/21; 114/331, 330, 333, 121
See application file for complete search history.

(56) References Cited

U.S. PATENT DOCUMENTS

| | | | |
|---|---|---|---|
| 3,228,369 A | 1/1966 | Warhurst et al. | |
| 3,665,884 A | 5/1972 | Gustafson | |
| 6,142,092 A | 11/2000 | Coupland | |
| 6,772,705 B2 | 8/2004 | Leonard et al. | |
| 8,136,470 B1 | 3/2012 | Buescher et al. | |
| 8,418,642 B2 * | 4/2013 | Vosburgh | 114/312 |
| 2007/0186837 A1* | 8/2007 | Bagley et al. | 114/333 |
| 2011/0297071 A1 | 12/2011 | Hudson et al. | 114/331 |
| 2012/0137949 A1* | 6/2012 | Vosburgh | 114/330 |
| 2012/0289103 A1 | 11/2012 | Hudson et al. | 440/38 |
| 2012/0318188 A1 | 12/2012 | Hudson et al. | 114/333 |
| 2013/0239870 A1* | 9/2013 | Hudson et al. | 114/333 |

FOREIGN PATENT DOCUMENTS

WO    2005/019021    3/2005

OTHER PUBLICATIONS

International Search Report issued in corresponding PCT application PCT/US2015/014523.

* cited by examiner

*Primary Examiner* — Helal A Algahaim
*Assistant Examiner* — Jelani Smith
(74) *Attorney, Agent, or Firm* — Sheppard Mullin Richter & Hampton LLP

(57) ABSTRACT

An underwater vehicle may include a buoyancy control system configured to use a dual-internal-reservoir configuration to enhance efficiency of changing buoyancy of the underwater vehicle. The buoyancy control system may utilize an incompressible fluid (e.g., oil or water) that is transferred between a first internal reservoir and an external chamber to affect buoyancy of the underwater vehicle. In exemplary implementations, a compressible fluid (e.g., air) may be used to inflate or deflate a second internal reservoir. The second internal reservoir may be disposed within the buoyancy control system so that it can act on the first internal reservoir by applying a compressive force or a tensive force on the first internal reservoir, depending on the pressure differences between the two reservoirs.

30 Claims, 5 Drawing Sheets

CONTROLLING BUOYANCY OF AN UNDERWATER VEHICLE USING A DUAL-INTERNAL-RESERVOIR CONFIGURATION TO ENHANCE EFFICIENCY OF INFLATING AND DEFLATING AN EXTERNAL CHAMBER

FIELD OF THE DISCLOSURE

This disclosure relates to systems, apparatus, and methods for controlling buoyancy of an underwater vehicle using a dual-internal-reservoir configuration to enhance efficiency of inflating and deflating an external chamber.

BACKGROUND

Buoyancy control techniques are generally known for underwater vehicles such as autonomous underwater vehicles (AUVs), submersible remotely operated vehicles (ROVs), manned submarines, and/or other underwater vehicles. Buoyancy may be controlled by affecting the overall density of an underwater vehicle relative to the density of the water in which the underwater vehicle is submersed. Because density is a function of volume and mass, affecting the overall density of an underwater vehicle typically may be achieved by affecting one or both of the effective volume of the underwater vehicle or the effective mass of the underwater vehicle. Affecting the effective volume of the underwater vehicle may be achieved by increasing or decreasing the volume of a flexible chamber that is external to a fixed volume body of the underwater vehicle. Affecting the effective mass of the underwater vehicle may be achieved by using surrounding water to fill a tank disposed within the underwater vehicle or draining that tank into the surrounding water. In either of these approaches, pumps are used to move fluid from one location to another. The energy required to operate such pumps may be a limiting factor for missions performed by an underwater vehicle. For example, the deployment duration of an underwater vehicle may be cut short if onboard batteries need to be changed or recharged, or if fuel needs to be replenished.

SUMMARY

One aspect of the disclosure relates to a buoyancy control system for an underwater vehicle, which may be configured to use a dual-internal-reservoir configuration to enhance efficiency of changing a buoyancy of the underwater vehicle. The system may comprise a first reservoir disposed within the underwater vehicle. A volume of the first reservoir may be alterable. The system may comprise a first pump configured to transfer a first medium between the first reservoir and an external chamber. The external chamber may be configured and arranged such that a change in volume of the external chamber causes a change in total water displacement of the underwater vehicle. The change in total water displacement may result in a corresponding change in buoyancy of the underwater vehicle. The system may comprise a second reservoir disposed within the underwater vehicle. A volume of the second reservoir may be alterable. The system may comprise a second pump configured to transfer a second medium in and out of the second reservoir. The first reservoir and the second reservoir may be disposed such that the second reservoir applies a compressive or tensive force to the first reservoir responsive to a fluid pressure or vacuum of the second medium within the second reservoir exceeding a fluid pressure or vacuum of the first medium within the first reservoir.

Another aspect of the disclosure relates to an underwater vehicle. The underwater vehicle may comprise a buoyancy control system and one or more processors configured to execute computer program instructions. The buoyancy control system may comprise a first reservoir having an alterable volume. A first medium may be transferrable between the first reservoir and an external chamber. The external chamber may be configured and arranged such that a change in volume of the external chamber causes a change in total water displacement of the underwater vehicle. The change in total water displacement may result in a corresponding change in buoyancy of the underwater vehicle. The buoyancy control system may comprise a second reservoir having an alterable volume. A second medium may be transferable into and out of the second reservoir. The first reservoir and the second reservoir may be disposed such that the second reservoir applies a compressive or tensive force to the first reservoir responsive to a fluid pressure or vacuum of the second medium within the second reservoir exceeding a fluid pressure or vacuum of the first medium within the first reservoir. The buoyancy control system may comprise a sensor configured to provide a flow signal conveying information associated with a flow of the first medium between the first reservoir and the external chamber. The computer program instructions may comprise a buoyancy control component configured to control the transfer of the second medium into and out of the second reservoir based on the flow signal.

Yet another aspect of the disclosure relates to a processor-implemented method for controlling buoyancy of an underwater vehicle. The method may be performed by one or more processors configured to execute computer program instructions. The method may comprise receiving a flow signal conveying information associated with a flow of a first medium between a first reservoir and an external chamber. The first reservoir may be disposed within the underwater vehicle and having an alterable volume. The external chamber may be configured and arranged such that a change in volume of the external chamber causes a change in total water displacement of the underwater vehicle. The change in total water displacement may result in a corresponding change in buoyancy of the underwater vehicle. In order to increase the buoyancy of the underwater vehicle, the method may comprise controlling, using one or more processors, a transfer of a second medium into a second reservoir based on the flow signal. The second reservoir may be disposed within the underwater vehicle and may have an alterable volume. The first reservoir and the second reservoir may be disposed such that the second reservoir applies a compressive or tensive force to the first reservoir responsive to a fluid pressure or vacuum of the second medium within the second reservoir exceeding a fluid pressure or vacuum of the first medium within the first reservoir. In order to decrease the buoyancy of the underwater vehicle, the method may comprise controlling, using one or more processors, a transfer of the second medium out of the second reservoir based on the flow signal. The first reservoir and the second reservoir may be mechanically coupled such that the second reservoir applies a tensive force to the first reservoir responsive to the fluid pressure of the first medium within the first reservoir exceeding the fluid pressure of the second medium within the second reservoir.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
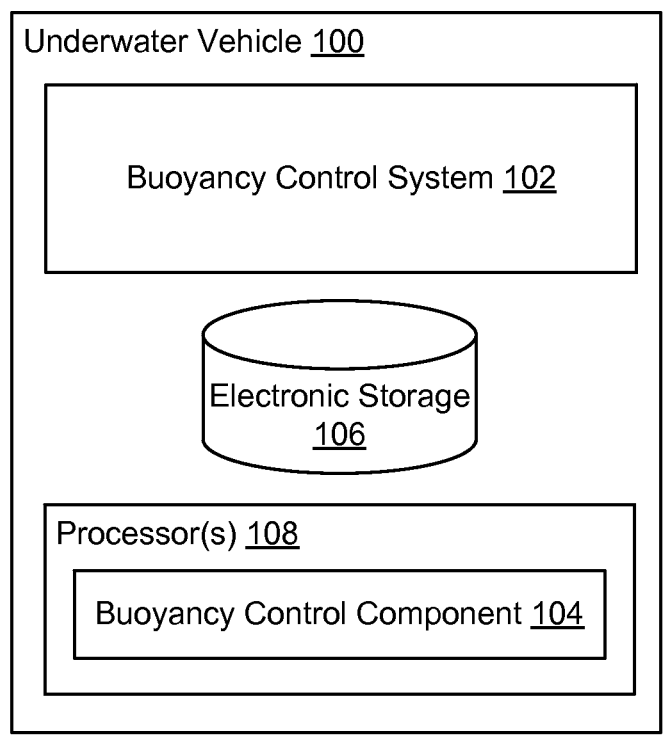
FIG. 1 illustrates an underwater vehicle, in accordance with one or more implementations.

FIG. 1 illustrates an underwater vehicle 100, in accordance with one or more implementations. The underwater vehicle 100 may include a buoyancy control system 102 configured to use a dual-internal-reservoir configuration to enhance efficiency of changing buoyancy of the underwater vehicle. The buoyancy control system 102 may utilize an incompressible fluid (e.g., oil or water) that is transferred between a first internal reservoir and an external chamber to affect buoyancy of underwater vehicle 100. In exemplary implementations, a compressible fluid (e.g., air) may be used to inflate or deflate a second internal reservoir. The second internal reservoir may be disposed within buoyancy control system 102 so that it can act on the first internal reservoir by applying a compressive force or a tensive force on the first internal reservoir, depending on the pressure differences between the two reservoirs.

Because the compressible fluid can be pumped using less energy relative to pumping the incompressible fluid, the force applied by second internal reservoir on the first internal reservoir may be used as a more efficient means of transferring the incompressible fluid between the first internal reservoir and the external chamber. A compressive force may cause or assist transference of incompressible fluid from the first internal reservoir to the external chamber, thereby increasing buoyancy of underwater vehicle 100. Conversely, a tensive force may cause or assist transference of incompressible fluid back into the first internal reservoir from the external chamber, thereby decreasing buoyancy of underwater vehicle 100.

Figure 2:
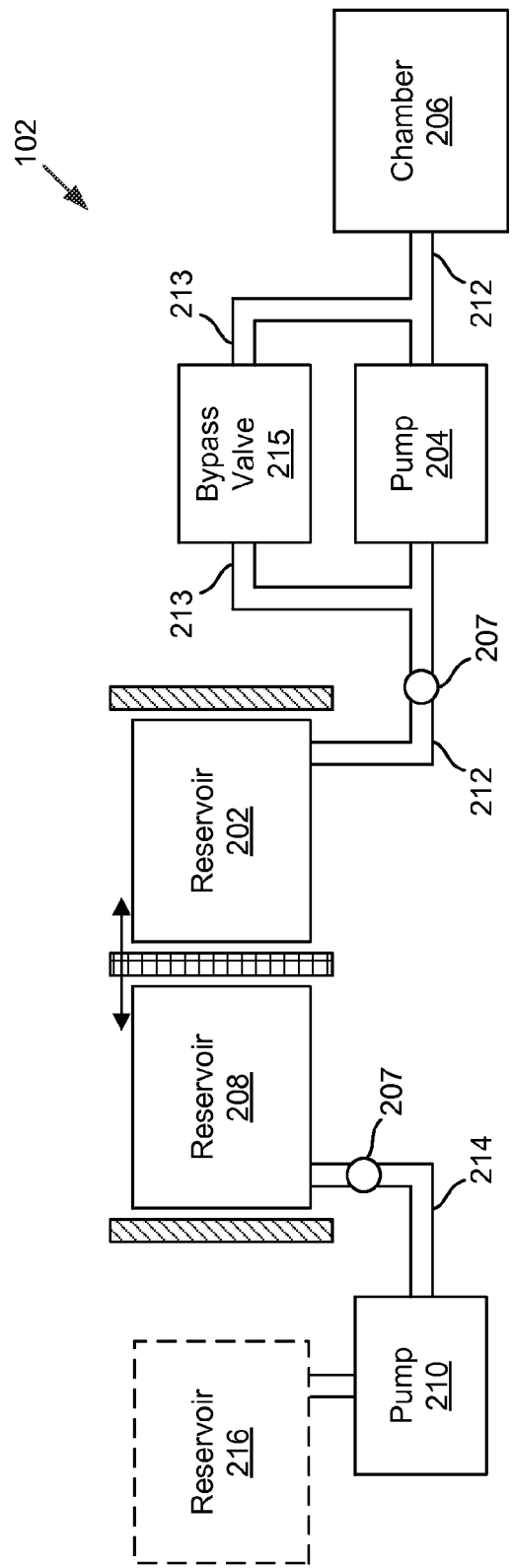
FIG. 2 illustrates a buoyancy control system for an underwater vehicle, configured to use a dual-internal-reservoir configuration to enhance efficiency of changing buoyancy of the underwater vehicle, in accordance with one or more implementations.

FIG. 2 illustrates buoyancy control system 102 in accordance with one or more implementations. As depicted in FIG. 2, buoyancy control system 102 may comprise one or more of a reservoir 202, a pump 204, a chamber 206, a sensor 207, a reservoir 208, a pump 210, and/or other components.

The reservoir 202 may have an alterable volume, as described further herein. The pump 204 may be configured to transfer a first medium between reservoir 202 and chamber 206 via conduit 212. The chamber 206 may be configured and arranged so that a change in volume of chamber 206 may cause a change in total water displacement (i.e., change in total volume) of underwater vehicle 100. The change in total water displacement may result in a corresponding change in buoyancy of underwater vehicle 100. The chamber 206 may be disposed completely outside of underwater vehicle 100. In some implementations, chamber 206 may be wholly or partially enclosed or shrouded by the body of underwater vehicle 100, but still able to affect the total displacement of underwater vehicle 100. For example, chamber 206 may be disposed within a void in underwater vehicle 100 that is otherwise filled with water from the surrounding environment such that when chamber 206 expands it displaces water from that void. The chamber 206 may comprise a bladder. In some implementations, a total combined volume of reservoir 202 and chamber 206 may be conserved. That is, the sum of the volumes of reservoir 202 and chamber 206 may be constant. The first medium may occupy the total combined volume of reservoir 202 and chamber 206. In some implementations, buoyancy control system 102 may include a bypass conduit 213 with a bypass valve 215 configured to circumvent pump 204 so that reservoir 202 is in direct fluid communication with chamber 206 via bypass conduit 213 when bypass valve 215 is open.

The sensor 207 may be configured to provide a flow signal conveying information associated with a flow. For example, sensor 207 may be configured to provide a flow signal conveying information associated with a flow of the first medium between reservoir 202 and chamber 206. The sensor 207 may be configured to provide a flow signal conveying information associated with a flow of the second medium in and/or out of reservoir 208. Examples of sensor 207 may include one or more of a flow meter, a pressure meter, a Pelton wheel or other mechanical meter, a particulate counter, an acoustic flow meter, an optical flow meter, a proximity switch, and/or other sensors configured provide a flow signal conveying information associated with a flow of a medium. In some implementations, a flow rate is determined based on pressure and time. The buoyancy control system 102 may include one or more sensors 207. While various positions for sensor 207 are indicated in FIGS. 2, 3A, 3B, 4A, and 4B, there are exemplary and are not intended to be limiting as other positions for sensor 207 within buoyancy control system 102 are contemplated and are within the scope of the disclosure.

The reservoir 208 may have an alterable volume, as described further herein. The pump 210 may be configured to transfer a second medium in and out of reservoir 208 via conduit 214. In some implementations, buoyancy control system 102 may include a third reservoir 216. The pump 210 may be configured to transfer the second medium between reservoir 208 and reservoir 216. According to some implementations, pump 210 may be configured to transfer the second medium between reservoir 208 and an internal portion of underwater vehicle 100, as described further herein.

In some implementations, the first medium contained by reservoir 202 and chamber 206 may be a hydraulic medium. Examples of hydraulic mediums may include one or more of oil, water, wax, liquid metal, amorphous solid, liquid polymer, phase change material, and/or other hydraulic fluids. The first medium may be incompressible. The pump 204 may be a hydraulic pump. The pump 204 may be a positive displacement pump.

The second medium contained by reservoir 208 may be a liquid that is less viscous than the first medium contained by reservoir 202 and chamber 206. Examples of such a liquid may include one or more of oil, water, and/or other hydraulic fluids. The pump 210 may be a hydraulic pump. The pump 210 may be a positive displacement pump. The pump 210 may use less energy to operate relative to pump 204.

According to some implementations, the second medium may be a pneumatic medium—a compressible gas. Examples of pneumatic media may include one or more of air, nitrogen, argon, carbon dioxide, and/or other gases. The pump 210 may be a pneumatic pump. The pump 210 may be a non-positive displacement pump.

The reservoir 202, chamber 206, and/or reservoir 208 may be deformable. The reservoir 202, chamber 206, and/or reservoir 208 may be made, at least in part, of a flexible material such as polyethylene, natural rubber, metal bellows, reinforced polymer, synthetic elastomer, and/or other flexible materials.

Several reservoir configurations may exist where reservoir 208 can act on reservoir 202 with compressive and/or tensive forces, according to various implementations. A total combined volume of reservoir 202 and reservoir 208 may be conserved. The reservoir 202 and reservoir 208 may be disposed such that reservoir 208 applies a compressive force to reservoir 210 responsive to a fluid pressure of the second medium within reservoir 208 exceeding a fluid pressure of the first medium within reservoir 202. In some implementations, reservoir 202 and reservoir 208 may not be joined so that compressive forces on reservoir 202 are possible, but tensive forces are not. The reservoir 202 and reservoir 208 may be mechanically coupled such that the second reservoir applies a tensive force to reservoir 202 responsive to the fluid pressure of the first medium within reservoir 202 exceeding the fluid pressure of the second medium within reservoir 208. Here, reservoir 208 may be a partial vacuum.

In some implementations, reservoir 202 may collapse responsive to reservoir 208 expanding. The reservoir 202 may expand responsive to reservoir 208 collapsing. By way of non-limiting example, reservoir 202 and reservoir 208 may each comprise accordion-type bellows joined together at one end such that a positive change in volume of reservoir 202 causes a negative change in volume of reservoir 208, and a negative change in volume of reservoir 202 causes a positive change in volume of the reservoir 208. The reservoir 202 and reservoir 208 may form other singular elements with reservoir 202 and reservoir 208 being separated by a membrane or septum that decreases diffusion of gases. Examples of such a membrane or septum may include one or more of a sheet of impermeable material, a sheet semi-permeable material, metalized or foilized polymers, low permeability elastomers, thermoplastics, and/or other membranes or septums.

In some implementations, reservoir 202 and reservoir 208 may be separated by a rigid or flexible barrier. The reservoir 202 and the reservoir 208 may be separated by a plunger that forms a shared boundary of reservoir 202 and the reservoir 208. A positive change in volume of reservoir 202 may cause a negative change in volume of reservoir 208 by moving the plunger. A negative change in volume of reservoir 202 may cause a positive change in volume of reservoir 208.

While various reservoir configurations are described herein and illustrated in certain figures, these are not intended to be limiting as other reservoir configurations are contemplated and are within the scope of the disclosure. For example, reservoir 208 may be a bladder disposed within reservoir 202 where the total combined volume of reservoir 202 and reservoir 208 is fixed such that (1) reservoir 208 applies a compressive force to reservoir 202 when a fluid pressure of the second medium within reservoir 208 is greater than a fluid pressure of the first medium within reservoir 202, and (2) reservoir 208 applies a tensive force to reservoir 202 when a fluid pressure of the second medium within reservoir 208 is less than a fluid pressure of the first medium within reservoir 202. As another example, in implementations where the first medium (which is used to inflate chamber 206) is a liquid and the second medium is a gas, reservoir 202 and reservoir 208 may be combined into a single reservoir such that the first medium directly contacts with the second medium at a horizontal liquid-gas interface. The volume of the combined reservoir consisting of the first medium may effectively be reservoir 202, and the volume consisting of the second medium may effectively be reservoir 208. A similar configuration may be achieved where the first medium and the second medium are liquids of differing densities. According to some implementations, the first medium and the second medium may have one or more different properties including viscosities, temperature coefficients, compressibility, molecular weight or specific gravity, and/or other different properties.

Figure 3A:
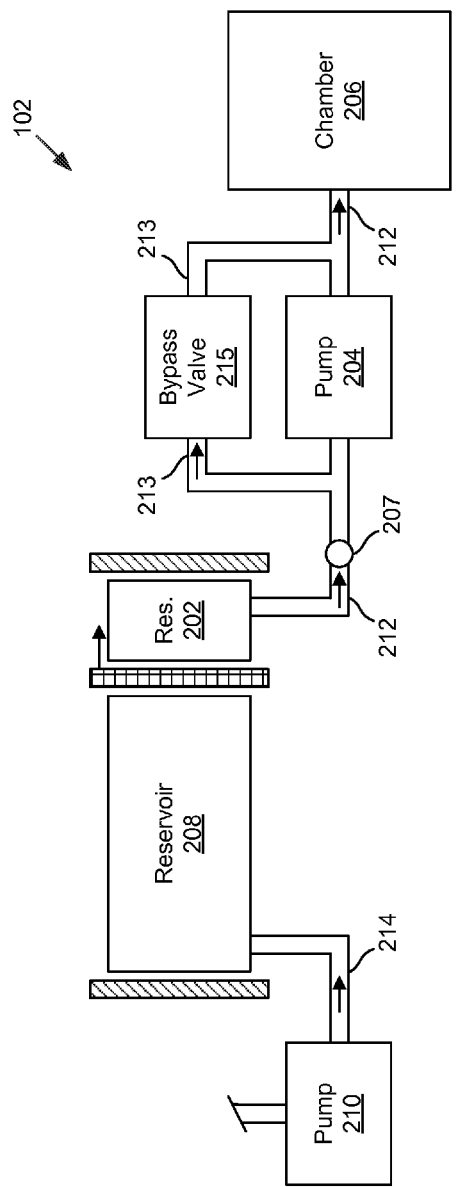
FIG. 3A illustrates a buoyancy control system increasing buoyancy of an underwater vehicle, in accordance with one or more implementations.

FIG. 3A illustrates buoyancy control system 102 increasing buoyancy of an underwater vehicle, in accordance with one or more implementations. In FIG. 3A, the second medium is being pumped into reservoir 208, which is providing a compressive force on reservoir 202 moving the first medium out of reservoir 202 into chamber 206. The bypass valve 215 may be open and pump 204 may be off so that the first medium is transferred directly from reservoir 202 to chamber 206 due only to the compressive force applied by reservoir 208 on reservoir 202. According to some implementations, when pump 204 is operating (at depth), pump 210 and reservoir 208 may generate compressive force to assist the feed of the first medium, while valve 215 is closed. At or near the surface, pump 204 may be off and valve 215 may be open so that pump 210 generates compressive force via reservoir 208 and first medium flows directly into external chamber 206.

Figure 3B:
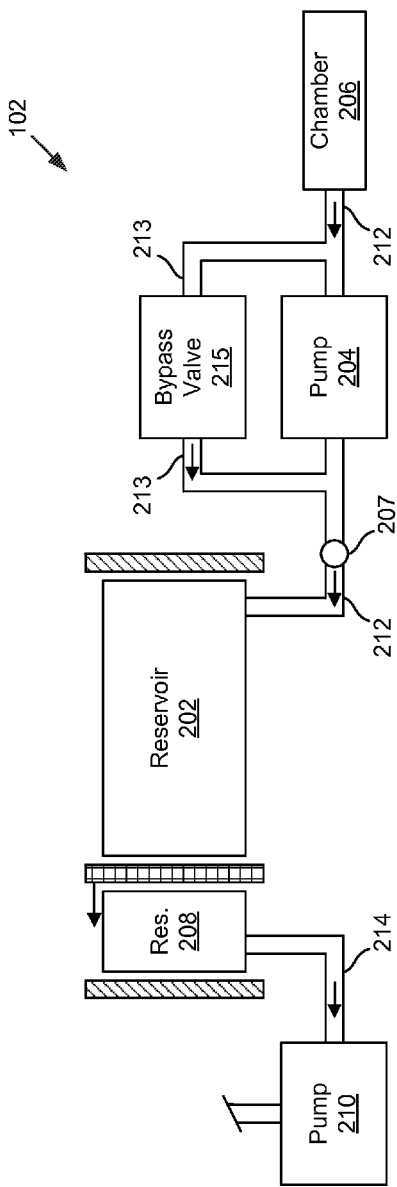
FIG. 3B illustrates a buoyancy control system decreasing buoyancy of an underwater vehicle, in accordance with one or more implementations.

FIG. 3B illustrates buoyancy control system 102 decreasing buoyancy of an underwater vehicle, in accordance with one or more implementations. In FIG. 3B, the second medium is being pumped out of reservoir 208, which is providing a tensive force on reservoir 202 drawing the first medium into reservoir 202 from chamber 206. The bypass valve 215 may be open and pump 204 may be off so that the first medium is transferred from to reservoir 202 from chamber 206 due only to the tensive force applied by reservoir 208 on reservoir 202.

Figure 4A:
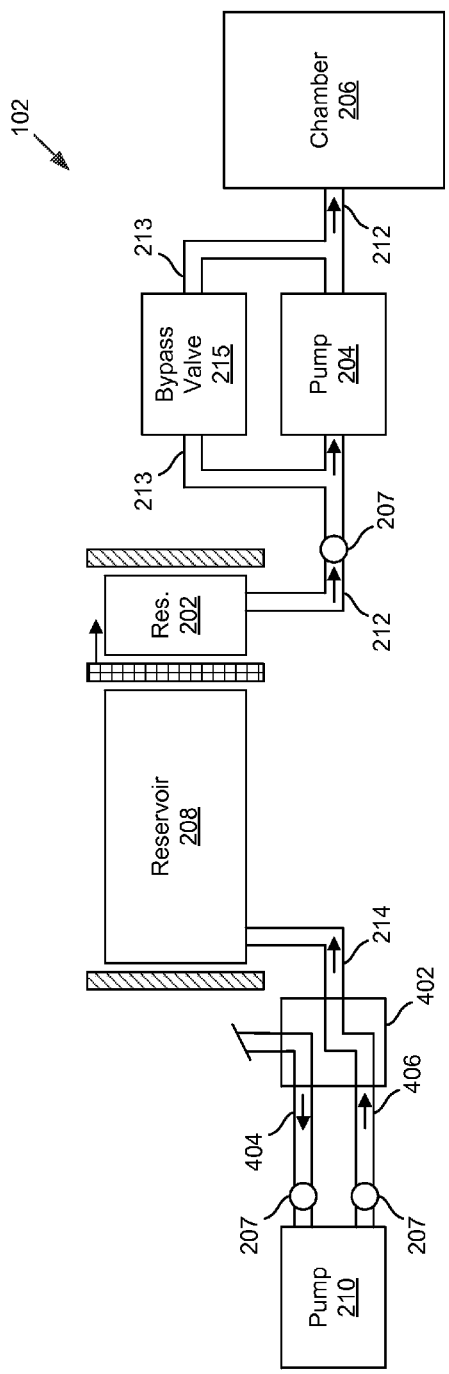
FIG. 4A illustrates a buoyancy control system increasing buoyancy of an underwater vehicle, in accordance with one or more implementations.

FIG. 4A illustrates buoyancy control system 102 increasing buoyancy of an underwater vehicle, in accordance with one or more implementations. The buoyancy control system 102 may include a valve 402 configured to allow pump 210 to inflate and deflate reservoir 208 without reversing directions. In FIG. 4A, valve 402 may be arranged so that the second medium is drawn through inlet 404 from an internal portion of underwater vehicle 100 (or from reservoir 216) into pump 210. The second medium may be pumped out of outlet 406 into conduit 214, which delivers the second medium into reservoir 208. The bypass valve 215 may be closed and pump 204 may be operating so that the first medium is transferred from reservoir 202 to chamber 206 due to both pump 204 and the compressive force applied by reservoir 208 on reservoir 202.

Figure 4B:
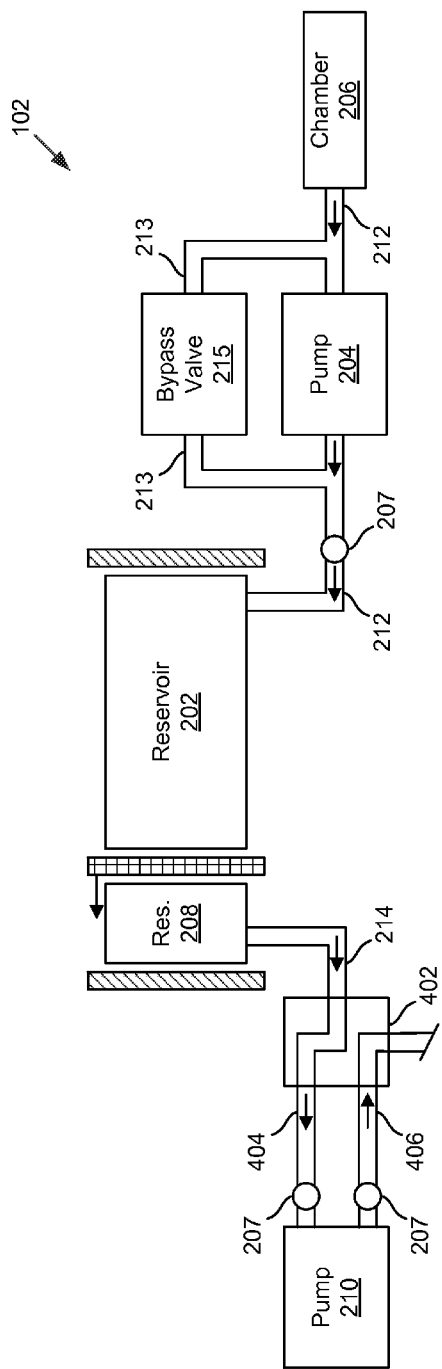
FIG. 4B illustrates a buoyancy control system decreasing buoyancy of an underwater vehicle, in accordance with one or more implementations.

FIG. 4B illustrates buoyancy control system decreasing buoyancy of an underwater vehicle, in accordance with one or more implementations. In FIG. 4B, valve 402 may be arranged so that the second medium is drawn through inlet 404 from conduit 214, which delivers the second medium from reservoir 208. The second medium may be pumped out of outlet 406 into an internal portion of underwater vehicle 100 (or from reservoir 216) from pump 210. The bypass valve 215 may be opened so that the first medium is transferred to reservoir 202 from chamber 206 due to both pump 204 and the tensive force applied by reservoir 208 on reservoir 202.

Referring again to FIG. 1, underwater vehicle 100 may be configured to execute one or more computer program instructions. The computer program instructions may include a buoyancy control component 104 and/or other instructions. The buoyancy control component 104 may be configured to control operation of one or more of pump 204, pump 210, bypass valve 215, valve 402, and/or other components of buoyancy control system 102. In some implementations, buoyancy control component 104 may be configured to control the transfer of the second medium into and out of reservoir 208 based on the flow signal provided by sensor 207.

Several algorithms may exist for increasing or decreasing buoyancy of underwater vehicle 100, which may require coordinating operations of one or more of pump 204, pump 210, bypass valve 215, valve 402, and/or other components of buoyancy control system 102. By way of non-limiting example, reservoir 208 may be inflated by pump 210 up to a first threshold pressure such that reservoir 208 continuously acts on reservoir 202 with a compressive force provided by the positive relative pressure of reservoir 208. The positive relative pressure of reservoir 208 may eventually decrease to a lower second threshold pressure as the first medium leaves reservoir 202. Responsive to the pressure of reservoir 208 breaching the second threshold pressure, pump 210 may re-pressurize reservoir 208 back up to or slightly beyond the first threshold pressure. According to some implementations, reservoir 208 may be evacuated by pump 210 up to the first threshold vacuum such that reservoir 208 continuously acts on reservoir 202 with a tensive force provided by the vacuum residing in 208. The vacuum of reservoir 208 may eventually decrease to a lower second threshold vacuum as the first medium leaves bladder 202. Responsive to the vacuum of reservoir 208 breaching the second threshold vacuum, pump 210 may re-evacuate reservoir 208 back to or slightly beyond the first threshold vacuum.

The underwater vehicle 100 may include electronic storage 106, one or more processors 108, and/or other components. The underwater vehicle 100 may include communication lines, or ports to enable the exchange of information with a network and/or a computing platform. Illustration of underwater vehicle 100 in FIG. 1 is not intended to be limiting. The underwater vehicle 100 may include a plurality of hardware, software, and/or firmware components operating together to provide the functionality attributed herein to underwater vehicle 100.

The electronic storage 106 may comprise non-transitory storage media that electronically stores information. The electronic storage media of electronic storage 106 may include one or both of system storage that is provided integrally (i.e., substantially non-removable) with underwater vehicle 100 and/or removable storage that is removably connectable to underwater vehicle 100 via, for example, a port (e.g., a USB port, a firewire port, etc.) or a drive (e.g., a disk drive, etc.). The electronic storage 106 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 106 may include one or more virtual storage resources (e.g., cloud storage, a virtual private network, and/or other virtual storage resources). The electronic storage 106 may store software algorithms, information determined by processor(s) 108, information received from other sources (e.g., another underwater vehicle, a satellite, a network, and/or other sources), and/or other information that enables underwater vehicle 100 to function as described herein.

The processor(s) 108 may be configured to provide information processing capabilities in underwater vehicle 100. As such, processor(s) 108 may include one or more of a digital processor, an analog processor, a digital circuit designed to process information, an analog circuit designed to process information, a state machine, and/or other mechanisms for electronically processing information. Although processor(s) 108 is shown in FIG. 1 as a single entity, this is for illustrative purposes only. In some implementations, processor(s) 108 may include a plurality of processing units. These processing units may be physically located within the same device, or processor(s) 108 may represent processing functionality of a plurality of devices operating in coordination. For example, processor(s) 108 may be implemented by a cloud of computing platforms operating together as processor(s) 108.

The processor(s) 108 may be configured to execute buoyancy control component 104 and/or other instructions. The processor(s) 108 may be configured to execute buoyancy control component 104 and/or other instructions by software; hardware; firmware; some combination of software, hardware, and/or firmware; and/or other mechanisms for configuring processing capabilities on processor(s) 108. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although buoyancy control component 104 is illustrated in FIG. 1 as being implemented within a single processing unit, in implementations in which processor(s) includes multiple processing units, buoyancy control component 104 may be partially or entirely implemented remotely from underwater vehicle 100. For example, a remote computing platform may execute buoyancy control component 104 and the corresponding instructions may be transmitted to underwater vehicle 100 via satellite transmission or other suitable communication method. The description of the functionality provided by buoyancy control component 104 described herein is for illustrative purposes, and is not intended to be limiting, as buoyancy control component 104 may provide more or less functionality than is described. For example, buoyancy control component 104 may be eliminated, and some or all of its functionality may be provided by other computer program instructions. As another example, processor(s) 108 may be configured to execute one or more additional components that may perform some or all of the functionality attributed herein to buoyancy control component 104.

Figure 5:
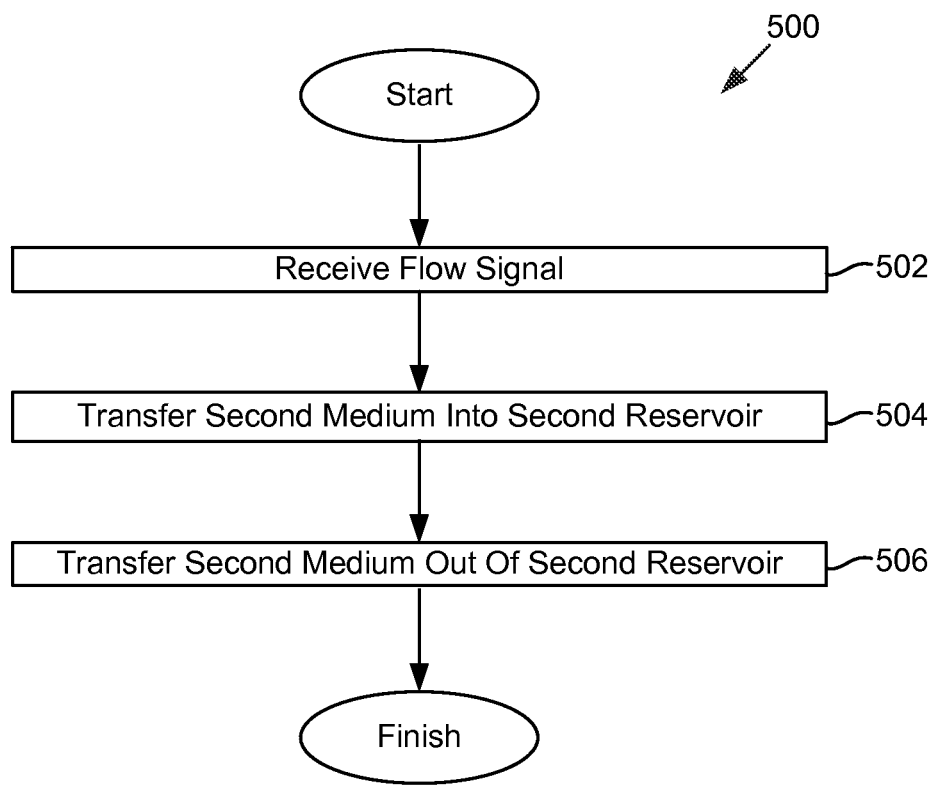
FIG. 5 illustrates a method for controlling buoyancy of an underwater vehicle, in accordance with one or more implementations.

FIG. 5 illustrates a method 500 for controlling buoyancy of an underwater vehicle, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, some or all of method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, a flow signal conveying information associated with a flow of a first medium between a first reservoir (e.g., reservoir 202) and an external chamber (e.g., chamber 206) may be received. The flow signal may be received from sensor 207. The first reservoir may be disposed within an underwater vehicle (e.g., underwater vehicle 100). The first reservoir may have an alterable volume. The external chamber may be disposed outside of the underwater vehicle such that a change in volume of the external chamber causes a change in total water displacement of the underwater vehicle. The change in total water displacement may result in a corresponding change in buoyancy of the underwater vehicle. Operation 502 may be performed by one or more processors configured to execute a buoyancy control component that is the same as or similar to buoyancy control component 104, in accordance with one or more implementations.

At an operation 504, in order to increase the buoyancy of the underwater vehicle, a transfer of a second medium into a second reservoir (e.g., reservoir 208) based on the flow signal may be effectuated. The second reservoir may be disposed within the underwater vehicle. The second reservoir may have an alterable volume. The first reservoir and the second reservoir may be disposed such that the second reservoir applies a compressive force to the first reservoir responsive to a fluid pressure of the second medium within the second reservoir exceeding a fluid pressure of the first medium within the first reservoir. In some implementations, the compressive force applied to the first reservoir by the second reservoir may cause the first medium to be transferred from the first reservoir to the external chamber (e.g., when bypass valve 215 is open). The compressive force applied to the first reservoir by the second reservoir may assist a first pump (e.g., pump 204) in transferring the first medium from the first reservoir to the external chamber (e.g., when bypass valve 215 is closed). Operation 504 may be performed by one or more processors configured to execute a buoyancy control component that is the same as or similar to buoyancy control component 104, in accordance with one or more implementations.

At an operation 506, in order to decrease the buoyancy of the underwater vehicle, a transfer of the second medium out of the second reservoir based on the flow signal may be effectuated. The first reservoir and the second reservoir may be mechanically coupled such that the second reservoir applies a tensive force to the first reservoir responsive to the fluid pressure of the first medium within the first reservoir exceeding the fluid pressure of the second medium within the second reservoir. In some implementations, the tensive force applied to the first reservoir by the second reservoir may cause the first medium to be transferred from external chamber 206 to the first reservoir (e.g., when bypass valve 215 is open). The tensive force applied to the first reservoir by the second reservoir may assist a first pump in transferring the first medium from the external chamber to the first reservoir (e.g., when bypass valve 215 is closed). Operation 506 may be performed by one or more processors configured to execute a buoyancy control component that is the same as or similar to buoyancy control component 104, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. Buoyancy control system for an underwater vehicle, configured to use a dual-internal-reservoir configuration to enhance efficiency of changing buoyancy of the underwater vehicle, the system comprising:
    a first reservoir disposed within the underwater vehicle, a volume of the first reservoir being alterable;
    a first pump configured to transfer a first medium between the first reservoir and an external chamber, the external chamber being configured and arranged such that a change in volume of the external chamber causes a change in total water displacement of the underwater vehicle, the change in total water displacement resulting in a corresponding change in buoyancy of the underwater vehicle;
    a second reservoir disposed within the underwater vehicle, a volume of the second reservoir being alterable; and
    a second pump configured to transfer a second medium in and out of the second reservoir;
    wherein the first reservoir and the second reservoir are disposed such that the second reservoir applies a compressive force to the first reservoir responsive to a fluid pressure of the second medium within the second reservoir exceeding a fluid pressure of the first medium within the first reservoir.

2. The system of claim 1, wherein the compressive force applied to the first reservoir by the second reservoir causes the first medium to be transferred from the first reservoir to the external chamber.

3. The system of claim 1, wherein the compressive force applied to the first reservoir by the second reservoir assists the first pump in transferring the first medium from the first reservoir to the external chamber.

4. The system of claim 1, wherein the first reservoir and the second reservoir are mechanically coupled such that the second reservoir applies a tensive force to the first reservoir responsive to the fluid pressure of the first medium within the first reservoir exceeding the fluid pressure of the second medium within the second reservoir.

5. The system of claim 4, wherein the tensive force applied to the first reservoir by the second reservoir causes the first medium to be transferred from external chamber to the first reservoir.

6. The system of claim 4, wherein the tensive force applied to the first reservoir by the second reservoir assists the first pump in transferring the first medium from the external chamber to the first reservoir.

7. The system of claim 1, wherein a total combined volume of the first reservoir and the external chamber is conserved.

8. The system of claim 7, wherein the first medium occupies the total combined volume of the first reservoir and the external chamber.

9. The system of claim 1, wherein a total combined volume of the first reservoir and the second reservoir is conserved.

10. The system of claim 1, wherein the first reservoir and the second reservoir form a singular element with the first reservoir and the second reservoir being separated by a membrane.

11. The system of claim 1, wherein the first reservoir and the second reservoir are separated by a plunger such that a positive change in volume of the first reservoir causes a negative change in volume of the second reservoir, and a negative change in volume of the first reservoir causes a positive change in volume of the second reservoir.

12. The system of claim 1, wherein the first reservoir and the second reservoir each comprise an accordion-type bellows such that a positive change in volume of the first reservoir causes a negative change in volume of the second reservoir, and a negative change in volume of the first reservoir causes a positive change in volume of the second reservoir.

13. The system of claim 1, wherein one or both of the first reservoir or the second reservoir are deformable.

14. The system of claim 1, wherein the first reservoir collapses responsive to the second reservoir expanding, and the first reservoir expands responsive to the second reservoir collapsing.

15. The system of claim 1, further comprising a third reservoir disposed within the underwater vehicle, wherein the second pump is configured to transfer the second medium between the second reservoir and the third reservoir.

16. The system of claim 1, wherein the second pump is configured to transfer the second medium between the second reservoir and an internal portion of the underwater vehicle.

17. The system of claim 1, wherein the first pump is a hydraulic pump and the second pump is a pneumatic pump.

18. The system of claim 1, wherein the first pump is a positive displacement pump and the second pump is a non-positive displacement pump.

19. The system of claim 1, wherein the first medium is a hydraulic medium and the second medium is a pneumatic medium.

20. The system of claim 1, wherein the first medium is more viscous than the second medium.

21. The system of claim 1, wherein the first medium is less compressible than the second medium.

22. The system of claim 1, further comprising a bypass conduit with a bypass valve configured to circumvent the first pump so that the first reservoir is in direct fluid communication with the external chamber via the bypass conduit when the bypass valve is open.

23. The system of claim 1, further comprising a sensor configured to provide a flow signal conveying information associated with a flow of the first medium between the first reservoir and the external chamber.

24. An underwater vehicle comprising:
buoyancy control system comprising:
a first reservoir having an alterable volume, a first medium being transferrable between the first reservoir and an external chamber, the external chamber being configured and arranged such that a change in volume of the external chamber causes a change in total water displacement of the underwater vehicle, the change in total water displacement resulting in a corresponding change in buoyancy of the underwater vehicle;
a second reservoir having an alterable volume, a second medium being transferable into and out of the second reservoir, wherein the first reservoir and the second reservoir are disposed such that the second reservoir applies a compressive force to the first reservoir responsive to a fluid pressure of the second medium within the second reservoir exceeding a fluid pressure of the first medium within the first reservoir; and
a sensor configured to provide a flow signal conveying information associated with a flow of the first medium between the first reservoir and the external chamber; and
one or more processors configured to execute computer program instructions, the computer program instructions comprising:
a buoyancy control component configured to control the transfer of the second medium into and out of the second reservoir based on the flow signal.

25. The underwater vehicle of claim 24, wherein the first reservoir and the second reservoir are mechanically coupled such that the second reservoir applies a tensive force to the first reservoir responsive to the fluid pressure of the first medium within the first reservoir exceeding the fluid pressure of the second medium within the second reservoir.

26. A processor-implemented method for controlling buoyancy of an underwater vehicle, the method being performed by one or more processors configured to execute computer program instructions, the method comprising:
receiving a flow signal conveying information associated with a flow of a first medium between a first reservoir and an external chamber, the first reservoir being disposed within the underwater vehicle and having an alterable volume, the external chamber being configured and arranged such that a change in volume of the external chamber causes a change in total water displacement of the underwater vehicle, the change in total water displacement resulting in a corresponding change in buoyancy of the underwater vehicle;
in order to increase the buoyancy of the underwater vehicle:
controlling, using one or more processors, a transfer of a second medium into a second reservoir based on the flow signal, the second reservoir being disposed within the underwater vehicle and having an alterable volume, wherein the first reservoir and the second reservoir are disposed such that the second reservoir applies a compressive force to the first reservoir responsive to a fluid pressure of the second medium within the second reservoir exceeding a fluid pressure of the first medium within the first reservoir; and
in order to decrease the buoyancy of the underwater vehicle:
controlling, using one or more processors, a transfer of the second medium out of the second reservoir based on the flow signal, wherein the first reservoir and the second reservoir are mechanically coupled such that the second reservoir applies a tensive force to the first reservoir responsive to the fluid pressure of the first medium within the first reservoir exceeding the fluid pressure of the second medium within the second reservoir.

27. The method of claim 26, wherein the compressive force applied to the first reservoir by the second reservoir causes the first medium to be transferred from the first reservoir to the external chamber.

28. The method of claim 26, wherein the compressive force applied to the first reservoir by the second reservoir assists a first pump in transferring the first medium from the first reservoir to the external chamber.

29. The method of claim 26, wherein the tensive force applied to the first reservoir by the second reservoir causes the first medium to be transferred from external chamber to the first reservoir.

30. The method of claim 26, wherein the tensive force applied to the first reservoir by the second reservoir assists a first pump in transferring the first medium from the external chamber to the first reservoir.

* * * * *